Aug. 12, 1952 — O. E. SORENSEN ET AL — 2,606,482
WORKHOLDER
Filed Nov. 4, 1948 — 3 Sheets-Sheet 1
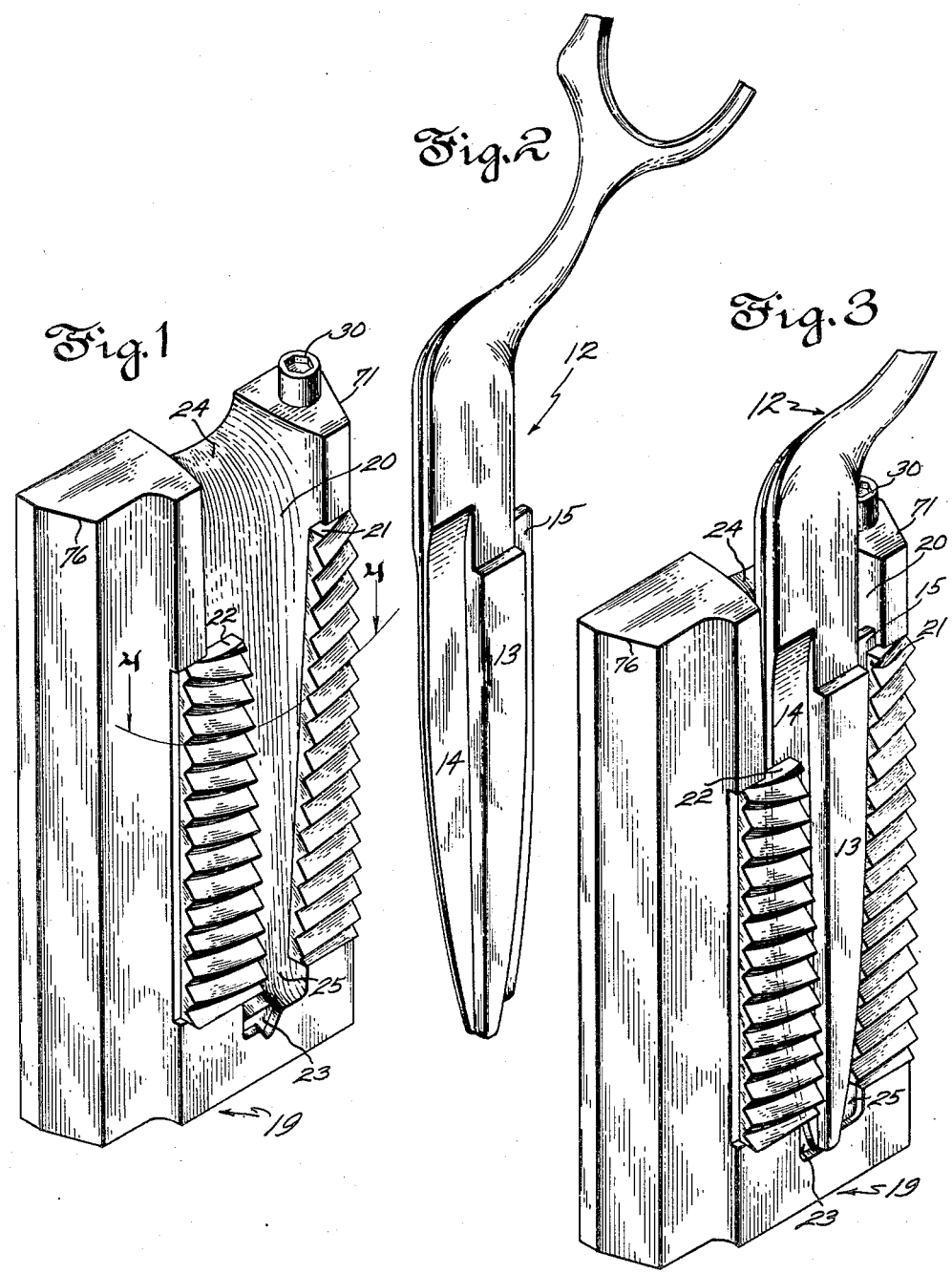
INVENTORS
George E. Sorensen
Otto E. Sorensen
BY
ATTORNEY

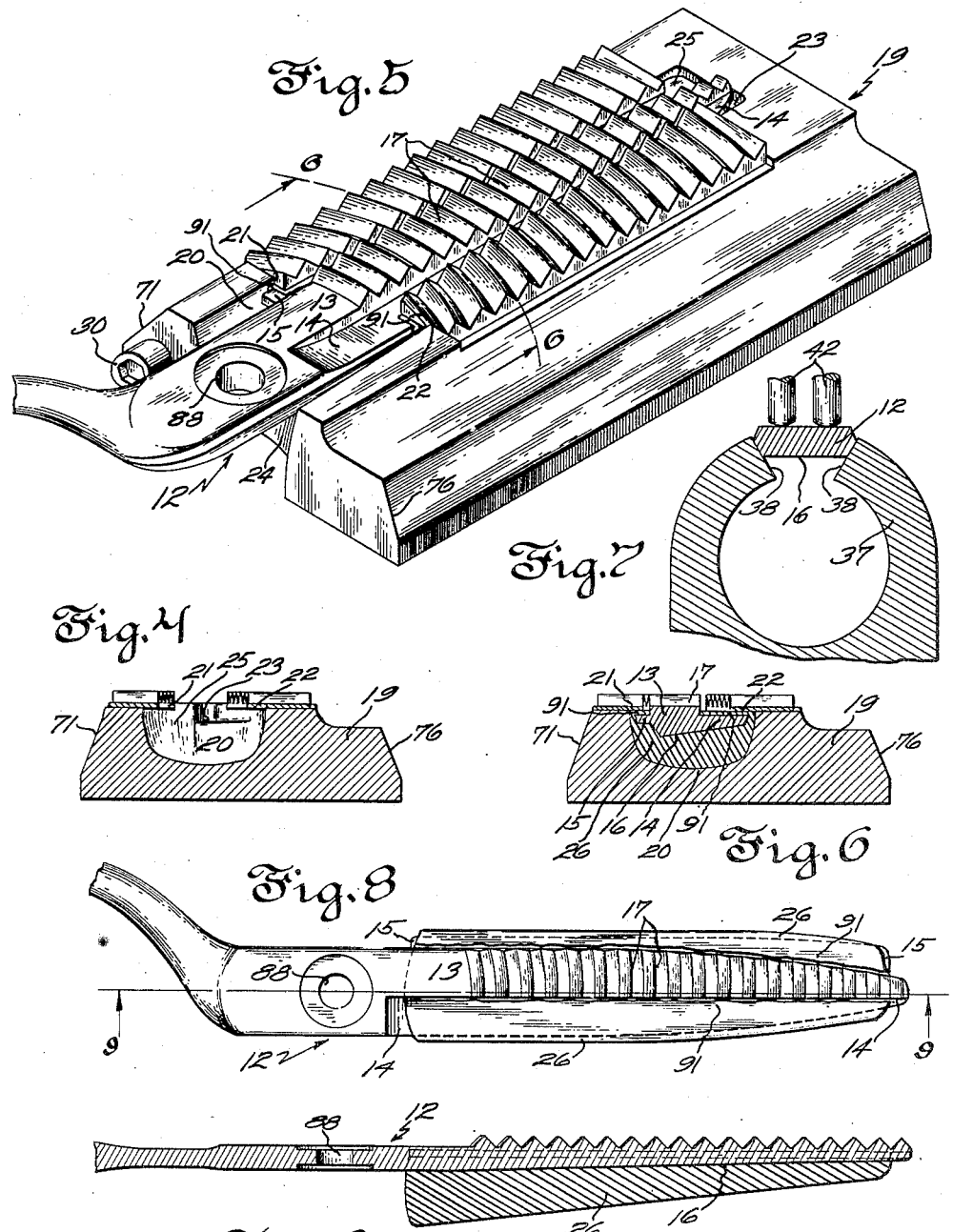

Patented Aug. 12, 1952

2,606,482

UNITED STATES PATENT OFFICE 2,606,482

WORKHOLDER

Otto E. Sorensen and George E. Sorensen, Fairfield, Conn., assignors to O. E. Sorensen, Incorporated, Bridgeport, Conn., a corporation of Connecticut Application November 4, 1948, Serial No. 58,282

7 Claims. (Cl. 90—59)

This invention pertains to methods and fixtures for firmly holding blade-like articles so that they may stand up to the cutting thrust of a machining tool without displacement from designed relationship thereto and without yielding distortion owing to structural weakness in the direction of the thinness of the blade-like article.

A particular problem solved by the present invention is that encountered in the machining of tooth forming grooves crosswise the broadside face of a pinking shear blade to enable the shears to perform a zig-zag cut. Such blades are commonly roughed out initially into the form of an unmachined blade blank by an operation of drop forging. By such process thin elongated fins may be squeezed outward laterally along opposite edges of the blade blank. It has heretofore been proposed to clamp such fins as a holding means against some work supporting structure of a machine tool by means of an ordinary form of clamp bar or "strap" capable of being tightened and loosened for respectively holding and releasing the work piece. An example of one formerly proposed method of so holding a shear blade appears in U. S. Patent No. 2,286,874. Many disadvantages are inherent in it including the lack of positive fixity of the workpiece in relation to the structure that holds it for machining, the freedom of the thin blade-like workpiece to flex and distort under the pressure of the cutting tool, and the time consuming operation of tightening and loosening the clamps in quantity production of blades successively making use of the same holding means.

An important object of the present improvements is so to lodge a thin blade-like workpiece removably in a holder or fixture for machining it that the workpiece can neither be budged nor distorted from its initial position and shape by the cutting thrust of a machining tool.

Another object is to provide a holding fixture for a blade blank having no relatively movable parts and in which a blade-like workpiece may be inserted and held by a solidifiable matrix-forming substance filling all spaces between the workpiece and the holding fixture.

Another object is to provide an integral holding fixture with a hollow adapted to receive and be filled by a matrix-forming solidifiable substance in liquid form while a workpiece also occupies said cavity, thereby to serve as a constraining mold for retaining the substance around the workpiece while the former solidifies. Preferably the hollow or cavity will be so tapered or provided with "draft" as to enable the workpiece together with its matrix substance to be withdrawn from the holding fixture without remelting the matrix substance.

A related object is to make use of a matrix substance which is sufficiently non-expansive responsively to a rise in temperature thereof, short of its melting point, to assist in the ease with which the workpiece and/or the matrix substance may be removed from the holding fixture with the aid of heat.

A particular object is to add strength and positiveness of location in the support of a blade-like blank while machining it by providing thin holding fins at the edges of the blank which are not required to be machined, and by bringing such fins into proximity to but preferably not into actual contact with the under surfaces of one or more overlapping shelf-like retaining shelves that are rigid with a holding fixture. This proximity of blade fins to fixture shelves occurs at points close beside machinable portions of the blade blank, and the resulting slight space between blade fins and fixture shelves permits the liquid matrix substance to flow therebetween and form a thin filler shim when it solidifies. To accommodate non-interfering passing of a machining tool into cutting engagement with the blade blank, such shelves of the fixture may be transversely grooved in a path or paths that are to be traversed by the machining tool, whereby a cut may be made crosswise in the blade blank so deep as to extend very nearly to the surface of the holding fin.

A further object of the present improvements is to provide apparatus for accurately locating and lodging the blade blank in its holding fixture prior to its being fixed therein by the aforementioned matrix substance.

A further object is to prevent escape of the matrix substance from the hollow of the holding fixture while in liquid or flowable form.

A further object is to assure uniform and accurate positioning sequentially of a quantity of blade blanks in respect to the same holding fixture in which they may successively be lodged for performing a series of like machining operations on each fixture held blade.

A further object is to provide the holding fixture with dependable means for attaching the same in predetermined exact locations in a series of blade blank machining stations associated with different tool machines if preferred.

A still further object is to make the holding fixture quickly detachable from apparatus designed to hold a blade blank fixedly therein while matrix substance in liquid form is being deposited to take over the function of fixing the blade blank to the holding fixture.

The foregoing and other objectives of the invention will appear in greater particular in connection with the following detailed description having reference to the appended drawings wherein:

Fig. 1 is a perspective view of our improved holder for a blade blank incorporating the features of the present invention.

Fig. 2 is a perspective view of a non-machined blade blank before grooves are cut in its machinable portion to form the finished shape of a pinking shears blade.

Fig. 3 shows the blade-like work blank of Fig. 2 inserted in the holding fixture of Fig. 1, loosely.

Fig. 4 is a view taken in cross section on the plane 4—4 in Fig. 1 looking in the direction of the arrows.

Fig. 5 is like Fig. 3 showing grooves cut crosswise in the machinable portion of the blade blank and a pivot hole and counter-bore machined therein while the blank remains fixed to the holding fixture by the matrix substance.

Fig. 6 is a view taken in section on the plane 6—6 in Fig. 5 showing the space between blade blank and holding fixture filled with a matrix forming substance.

Fig. 7 is a view taken in cross section on the plane 7—7 in Fig. 10 looking in the direction of the arrows.

Fig. 8 is a plan view of the blade blank removed from the holding fixture of Fig. 5 still embraced by the matrix substance in its solid state.

Fig. 9 is a section taken on the plane 9—9 in Fig. 8, looking in the direction of the arrows 9—9.

Figure 10:
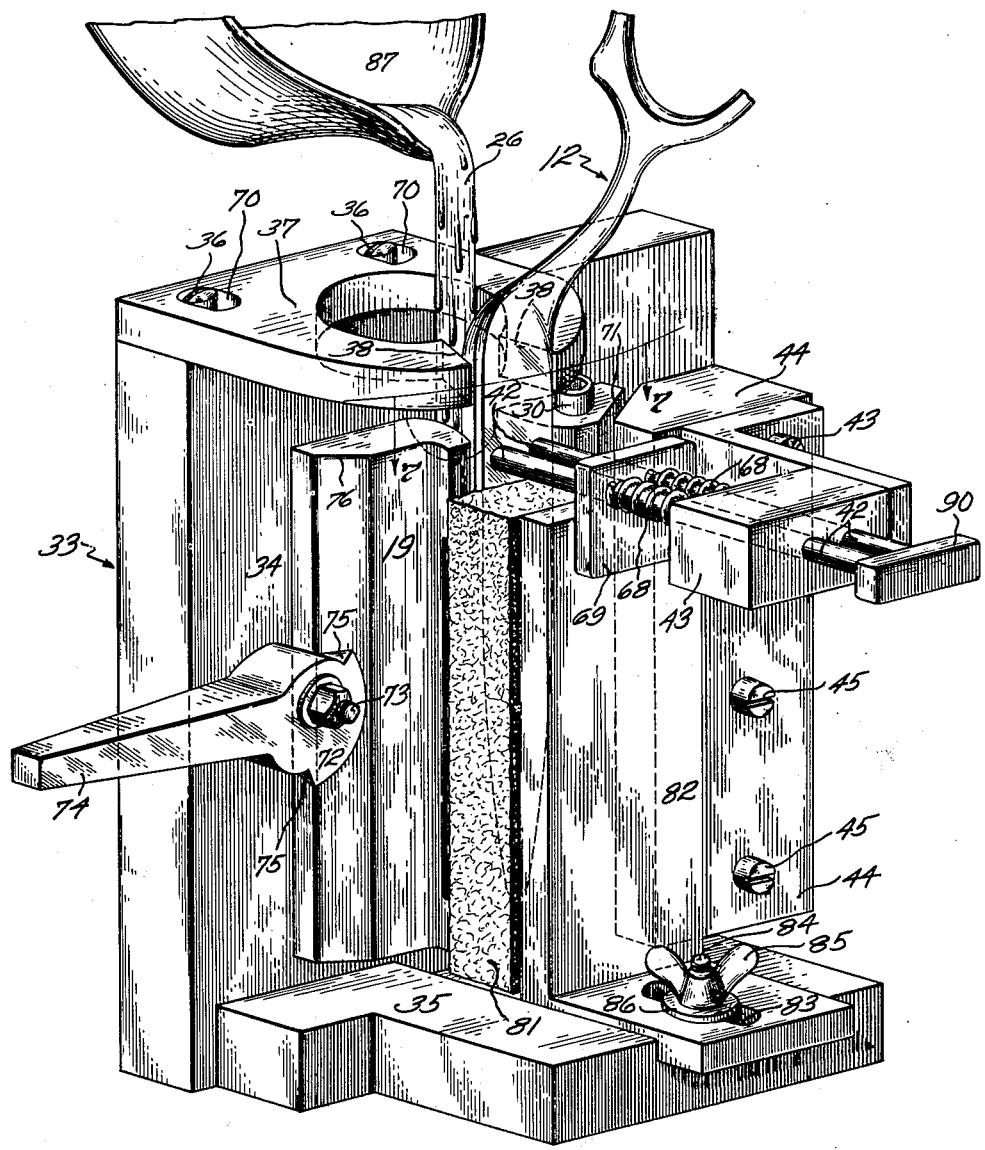
Fig. 10 shows the combined holding fixture and blade blank of Fig. 3 clamped temporarily in fixed predetermined relationship to each other and in quickly detachable relationship to apparatus that assists in loading the holding fixture with pourable matrix substance.

The blade blank 12, as shown in Fig. 2, is characteristically composed of a relatively thick machinable portion 13 flanked by a relatively thin or non-machinable flange-like portion or fin 14. In the drop forging operation by which such blade blanks are produced there may be squeezed out from the metal of the forging another or extraneous fin 15 extending along the longitudinal edge of the blank opposite flange 14 for purposes of providing a holding means for the blade blank throughout its length and at points other than on the machinable portion 13. The machinable blank portion 13 must be left clear of fastening means in order to permit passing of a blank cutting tool therethrough without interference.

Heretofore it has been proposed to clamp down the blade blank by drawing its back surface 16 tightly against some support element of a machine tool by downward pressure of straps or clamps applied at the marginal edges of the flange 14 and holding-fin 15. Still another way of holding a blade-like work blank is by forging an extraneous holding lug at the extreme tip of the blade, perforating the same and securing it to a holding surface by a screw fastening. The present improvements make unnecessary, any holding lug at the tip of the blade.

To avoid the disadvantage of these former practices the invention provides a block-like metallic fixture 19 with an elongated hollow 20 open faced at the top in Figs. 4, 5 and 6, open ended at 24 and dead ended at 25. Fixture 19 is further provided with two retaining shelves 21 and 22 projecting from its body at respectively opposite brims of the hollow 20 in a manner to overhang the open face of this hollow so as to retainingly flank the ridged holding fin 15 and the holding flange 14 respectively of the blade blank when the latter is inserted endwise in the hollow of the fixture. Because the bottoms of arcuate grooves 17 which are to be cut in the thicker portion 13 of the blade blank must be close to the level of the thin marginal fins 15 of the blank, a thickness of flanges 14 is desirable for strength that would block the path of the tool used to cut grooves 17 in the work, wherefore flanges 14 are provided with corresponding arcuate clearance grooves to permit unimpeded passing of the tool through flanges 14 while preserving requisite strength of the latter.

In any suitable manner we may firmly hold said fin and flange close to, but preferably not touching, the inner surfaces of the respective fixture shelves 21 and 22 while the tip end of the blade blank lies nested in an accurately positioning niche 23 at the dead end 25 of hollow 20 thus leaving vacant a substantial space between the blade blank and the fixture because hollow 20 is substantially larger in girth than the profile of the blade blank, being both wider and deeper than same.

As an example of apparatus suited to holding the blade blank 12 firmly in fixed relation to the holding fixture 19, Fig. 10 shows an example of loading apparatus which consists of a rugged stand 33 whose upright wall 34 is rigid with the base 35 and has fixedly secured to its top edge by screws 36 a horseshoe type of rest 37 having the spaced abutment seats 38 inclined to each other like the sides of a V, so that the edges of the shear blade will become centered between seats 38 when subjected to a thrust acting toward the latter. Such thrust force may be exerted by two plungers 42 longitudinally slidable in a bearing block 43 outstanding from the upright wall 34 and held in rigid relation to the latter by a bolt 43. Bolt 43 also penetrates a dovetail stay block 44 and threads into the stand wall 33 as do additional bolts 45 which make the bearing block 43 and the dovetail block 44 rigid parts of the stand 33.

Two springs 68 are under axial compression and loosely coiled about plungers 42 respectively, so that they constantly thrust plungers 42 toward the left against the blade blank in Fig. 10 by pressing on a plunger carried thrust collar 69 fixed to both plungers.

The blade blank holding fixture 19 of Fig. 3 has its beveled edge 71 wedged under the overhanging lip of dovetail block 44 by means of a quick acting cam 72 that is free to turn on the stationary pivot stud 73 fixed in stand wall 34. Cam 72 is swung by means of handle 74 and has a fixture clamping periphery 75 of conical spiral shape which wedges against the other beveled edge 76 of holding fixture 17 as it swings about pivot stud 73.

As the wedging surface of cam 72 swings upward in Fig. 10 for tightening holder 19 against the dovetail block 44 it urges the holding fixture upward until a locating pad or projection 30 on the fixture abuts against the rest 37. After this no swinging of cam 72 is able to lift holding fixture 19 any farther, whereupon the holding fixture becomes definitely related in a longitudinal direction to the abutment seats 38 of rest 37. The blade blank is locked in definite relation to the stand 33 also in its broad side direction by the lodgement of its edges against the seats 38 of V-rest 37 through the pressure against it of plungers 42. Furthermore the tip end of the blade blank rests in the niche 23 and is pressed to a bottoming position therein by the cantilever actuating force of plungers 42 with respect to abutment seats 38 acting as a fulcrum. This holds the blade flange 14 and the fin 15 in a position slightly spaced away from the holding fixture shelves 22 and 21, respectively. The blade blank is longitudinally located by means of its end dropping to the lowest permissible point in the niche 23 which is shaped to fit it. V-rest 37 is adjustable by means of slots 70 to compensate for irregularity in dimensions of different blade blanks.

The matrix loading apparatus further includes a compressible barrier or matrix damming slab 81 of resilient material which may be sponge rubber, and if so, will preferably have an external imperforate skin facing the blade blank and the ridged shelves of the holding fixture. Slab 81 is carried on an L-shaped slide 82 whose foot is guided toward and away from the blade blank by riding in a groove in the stand base 35. An elongated hole 83 in the slide foot accommodates a stationary threaded stud upstanding fixedly from stand base 35 and on which the thumb nut 85 screws down against the thrust washer 86 to fasten slide 82 releasably either when pressed against or retracted away from the combined broadside faces of the blade blank and its holding fixture appearing in Fig. 3. This prevents leakage of molten matrix substance 26 out of the hollow 20 in fixture 19 when the matrix substance is poured into such hollow from a ladle 87 or the like in the manner shown in Fig. 10.

The manner of loading the holding fixture 19 of Fig. 1 with the blade blank 12 of Fig. 2, or with any work piece of similar thin and slender proportions, and fixing the same therein is mainly apparent from the foregoing description. Fixture 19 may first be clamped in wedged relation to dovetail block 44 by swinging cam 72 counterclockwise in Fig. 10 at which time the projecting fixture pad 30 will be in fixture locating contact with rest 37. Plungers 42 are withdrawn toward the right in Fig. 10 by means of their common handle 90, so that blade 12 can be dropped into the hollow of the fixture with its bottom tip resting in niche 23 as shown in Fig. 3 and with the edges of its hilt lodged on the V-seats 38, 38 respectively. Handle 90 is then released, so that under the urge of springs 68, plungers 42 press blade 12 into laterally centralized position against seats 38 as shown in Fig. 7. This also exerts a cantilever moment on the blade length with respect to seats 38 as a fulcrum whereby the bottom tip of the blade is pressed against the locating floor of niche 23 which orients the blade flange 14 and blade fin 15 at a slight spacing from fixture shelves 22 and 21. All openings from the fixture hollow 20 at the broadside combined faces of fixture and blade blank, which are directed toward the right in Fig. 3, are next dammed by sliding the slab 81 of soft resilient material backward firmly against same as in Fig. 10, after which the thumb nut 85 may be set down to hold it firmly there. The contacting face of this damming slab is large enough to cover all of the combined faces of fixture and blade blank referred to, and it acts as a gasket in conforming fully thereto.

All that remains to be done to fix the blade blank in its now definitely oriented relation to the holding fixture is to pour the molten matrix substance 26 through the opening in rest 37 downward into the fixture hollow 20 until the latter is completely filled including the slight space, before mentioned, that separates blade flange and fin from the fixture shelves. In this space there will be formed a thin shim 91 of the matrix substance appearing in Figs. 5, 6, and 8.

The matrix substance which is preferred has physical properties that are characteristic of bismuth alloys such as a low melting temperature, and the peculiarity of expanding slightly on solidification. It should have sufficient hardness to prevent compressive distortion or peening effects under the force of heavy pressures. Specifically a substance may be chosen having a melting temperature of below 250 degrees and a pouring temperature ranging from 300 degrees to 400 degrees. Its compression strength may be as great as 16,000 pounds per square inch and it should be capable of expanding .002 inch per inch in the course of cooling to a solidified state as is a characteristic of some bismuth alloys.

When through its cooling and solidification the matrix substance 26 and blade blank 12 have become adhered to the fixture 19, the latter may be used to handle and convey the blank while it is being machined to the shape shown in Fig. 5 and for carrying the blank to or from other processing stations or machines. In each machine or apparatus to which the blade blank is transferred one or more hardened screw stud heads 30 projecting from fixture 19 may serve to contact with work locating points in various machine tools as a dependable way of accurately registering given surfaces in lapping, polishing, and other operations to which the blank may be subjected successively.

One such other operation is illustrated by the boring and counter-boring of a pivot hole in the blade, such as appears at 88 in Figs. 5, 8, and 9. Since the outer extremity of hardened stud head 30, or other locating pad, on fixture 19 remains in dependably fixed relation to the arcuate grooves 17 which may first be cut crosswise the blade blank in a milling machine or on the face plate of a lathe, such stud head by being brought into locating abutment with some prepositioned stop on the bed of a drill press obviously can insure that hole 88 will be drilled concentrically with the arc of curvature of grooves 17 as to distance of the hole from the grooves lengthwise of the blade. Equally accurate placement of the pivot hole laterally of the blade can be insured by using the side edges of the fixture as fixture positioning elements both in the drill press and in the milling machine or lathe.

When all processing of the blade has been completed and it is desired to remove the work from fixture 19, it is found advantageous to dip the fixture with its carried blank and matrix metal into a bath of hot oil. The heat of this oil, which will be less than the melting point of the matrix substance, is found to create a differential of expansion between the blade blank and the metal body of the fixture such as will loosen the fit of the matrix substance in the hollow of the fixture. Thereupon the blade blank with its still solidified matrix substance clinging to it may be withdrawn endwise from the hollow 20 as shown in Figs. 8 and 9 and the hollow may taper to facilitate removal of the work from the fixture in this manner.

The blade blank may then be withdrawn from the still solidified matrix substance by or without melting the latter. We have discovered that owing to the brittleness of the solidified matrix substance it can be struck a sufficiently sharp blow while the work blank remains embraced thereby after removal from the fixture to shatter the matrix substance so that it parts instantly and cleanly in fragments from the work blank. In any event the matrix substance may ultimately be remelted for subsequent repeated use. The holding fin 15 will be removed by a snagging operation whereupon after such surface finishing as is desired the blade is ready for assemblage in a finished shears.

The appended claims are directed to and intended to cover all substitutes and obvious equivalents for the method steps and structural elements recited in combination therein as are fairly contemplated by the most inclusive meaning of the language used in the claims.

We claim:

1. Apparatus for loading a work holding fixture with an elongated blade-like work blank and firmly attaching said blank to said fixture removably by use of a meltable matrix-like substance, including in combination with said work blank, a work blank holding fixture comprising a body having an elongated open-sided hollow with one end thereof closed to check the flow of molten matrix substance therefrom and with its opposite end open to receive said blank and said substance when the latter is poured into said hollow in a liquid state, said body further having at least one retaining shelf in fixed relation thereto jutting from the brim of said hollow in a manner to overhang the latter for overlapping a portion of said blank in the presence of said substance, and a compressible slab of gasket material movably mounted in said apparatus in a manner to be forced into liquid sealing conformity with both said work blank and said overlapping retaining shelf simultaneously.

2. Apparatus for loading a work holding fixture with an elongated blade-like work blank and attaching said blank removably to said fixture by use of a meltable matrix-like substance, including in combination with said work blank, a work blank holding fixture comprising a body having an elongated open-sided hollow with one end thereof closed to check the flow of molten matrix substance therefrom and with its opposite end open to receive said blank endwise and to receive said substance when the latter is poured into said hollow in a liquid state, said body further having at least one retaining shelf in rigid relation thereto jutting from the brim of said hollow in a manner to overhang the latter for overlapping a portion of said blank in the presence of said substance, a support independent of said fixture body located in said apparatus for orienting abutment with the work blank, means to station said fixture in fixed relation to said support, and fastening mechanism operative to exert a thrust on said blank at a point and in a direction to urge said blank against said support and simultaneously away from said retaining shelf.

3. Apparatus for loading a work holding fixture with an elongated blade-like work blank and attaching said blank removably to said fixture by use of a meltable matrix-like substance, including in combination with a work blank having relatively thin longitudinal marginal fins forming respectively opposite edges thereof, a work blank holding fixture comprising a body having an elongated open-sided hollow with one end thereof closed to check the flow of molten matrix substance therefrom and with its opposite end open to receive said blank endwise and to receive said substance when the latter is poured into said hollow in a liquid state, said body further having two retaining shelves in fixed relation thereto jutting toward each other from opposite brims of said hollow in a manner to overhang the latter for overlapping said fins of said blank in the presence of said substance, and means to fill said hollow with said meltable substance.

4. Apparatus for loading a work holding fixture with an elongated blade-like work blank and attaching said blade removably to said fixture by use of a meltable matrix-like substance, including in combination with a work blank having relatively thin longitudinal marginal fins forming respectively opposite edges thereof and having an orienting tip, a work blank holding fixture comprising a body having an elongated open-sided hollow one end of which is closed and terminates in a niche shaped and positioned to seat and steady said orienting tip of the work blank and having two retaining shelves in rigid relation to said body jutting toward each other from opposite brims of said hollow in a manner to overhang the latter and overlap said fins of the work blank, a support independent of said fixture located in said apparatus for abutment with the work blank to orient the latter in relation to said fixture, means to station said fixture in fixed relation to said support, and fastening mechanism operative to urge said blank in a direction away from said retaining shelves toward a position wherein said blank is spaced from the latter with its said tip lodged in said orienting niche.

5. A holding fixture adapted to carry an elongated blade-like work blank in fixed relation thereto from one to another of successive machining operations, comprising, a work blank holding body having an open sided elongated hollow adapted to receive said blank therein, and at least one retaining shelf in fixed relation to said body grooved on its outer surface to permit non-interfering passing thereacross of a machining tool into cutting engagement with said blade-like work blank and jutting from the brim of said hollow in a manner to overhang the hollow and form a definite boundary therefor, thereby to overlap a portion of said work blank when the latter occupies said hollow.

6. A holding fixture adapted to carry an elongated blade-like work blank from one to another of successive machining operations while secured to said fixture by a meltable matrx-like substance, comprising a body having an elongated open-sided hollow with one closed end to check the flow of said substance therefrom when the substance is melted and with one open end to receive said blank and said substance when the latter is poured thereinto in molten state, and at least one retaining shelf grooved on its outer surface to permit non-interfering passing thereacross of a machining tool into cutting engagement with said blade-like work blank and projecting from said body toward said hollow in a manner to overhang the hollow for overlapping a portion of said work blank in the presence of said substance.

7. A holding fixture adapted to carry an elongated blade-like work blank from one to another of successive machining operations while secured to said fixture by a meltable matrix-like substance, comprising a body having an elongated open-sided hollow with one closed end to check the flow of said substance therefrom when the substance is melted and with one open end to receive said blank and said substance when the latter is poured thereinto in molten state, and at least one retaining shelf projecting from said body toward said hollow in a manner to overhang the follow for overlapping a portion of said work blank in the presence of said substance, together with a locating niche in said fixture body at said dead end of the elongated hollow therein shaped and positioned to seat and steady one end of said work blank in predetermined relation to said retaining shelf.

OTTO E. SORENSEN.
GEORGE E. SORENSEN.

REFERENCES CITED

The following references are of record in the file of this patent:

UNITED STATES PATENTS

| Number | Name | Date |
|---|---|---|
| 687,494 | Clare | Nov. 26, 1901 |
| 1,551,342 | Steenstrup | Aug. 25, 1925 |
| 1,882,755 | Boynton | Oct. 18, 1932 |
| 2,279,616 | Canterbury | Apr. 14, 1942 |
| 2,352,178 | Bolsey | June 27, 1944 |

FOREIGN PATENTS

| Number | Country | Date |
|---|---|---|
| 535,905 | Germany | Oct. 16, 1931 |